(12) United States Patent
Ragusa et al.

(10) Patent No.: US 11,605,256 B2
(45) Date of Patent: Mar. 14, 2023

(54) CONTROLLING LOCATIONS SHARED AMONG MULTIPLE OPERATORS

(71) Applicant: International Business Machines Corporation, Armonk, NY (US)

(72) Inventors: Roberto Ragusa, Rome (IT); Elisabetta Quaranta, Rome (IT); Marco Mulas, Rome (IT); Paolo Ottaviano, Rome (IT)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 16/816,437

(22) Filed: Mar. 12, 2020

(65) Prior Publication Data

US 2021/0287473 A1 Sep. 16, 2021

(51) Int. Cl.
| | |
|---|---|
| *G07C 9/38* | (2020.01) |
| *G06Q 30/00* | (2012.01) |
| *G06Q 10/08* | (2012.01) |
| *H04L 9/40* | (2022.01) |
| *G07G 3/00* | (2006.01) |
| *G06K 7/10* | (2006.01) |
| *G07C 9/15* | (2020.01) |
| *G06Q 30/018* | (2023.01) |
| *G06Q 10/087* | (2023.01) |

(52) U.S. Cl.
CPC ............ *G07C 9/38* (2020.01); *G06K 7/10297* (2013.01); *G06Q 10/087* (2013.01); *G06Q 30/0185* (2013.01); *G07C 9/15* (2020.01); *G07G 3/003* (2013.01); *H04L 63/126* (2013.01)

(58) Field of Classification Search
None
See application file for complete search history.

(56) References Cited

U.S. PATENT DOCUMENTS

| | | | |
|---|---|---|---|
| 5,745,036 A | 4/1998 | Clare | |
| 9,328,537 B2 | 5/2016 | Joseph | |
| 10,332,117 B2 | 6/2019 | Krause et al. | |
| 10,600,298 B1 * | 3/2020 | Diorio | ................ G07C 9/28 |
| 2012/0271712 A1 | 10/2012 | Katzin et al. | |

(Continued)

FOREIGN PATENT DOCUMENTS

| | | | | |
|---|---|---|---|---|
| KR | 20180021116 A | * | 12/2016 | ......... G02B 27/0172 |
| KR | 101789181 B1 | * | 11/2017 | |

OTHER PUBLICATIONS

Abdulkareem, "Development and implementation of a miniature RFID system in a shopping mall environment," International Journal of Electrical and Computer Engineering (IJECE), vol. 9, No. 2, Oct. 2018, pp. 1374-1378, ISSN: 2088-8708, DOI: 10.11591/ijece. v9i2.

*Primary Examiner* — Ariel J Yu

(74) *Attorney, Agent, or Firm* — Peter J. Edwards

(57) ABSTRACT

A method includes controlling a shared location. Item identifiers are read from a set of items (pertaining to one or more operators sharing the shared location) reaching a gate of the shared location. A verification request message for the item identifiers is broadcast for receiving corresponding verification response messages from central computing systems of the operators. A passage of the items through the gate is controlled according to the verification response messages. A computer program and a computer program product for performing the method are also proposed. Moreover, a system for implementing the method is proposed.

20 Claims, 8 Drawing Sheets

(56) References Cited

U.S. PATENT DOCUMENTS

2013/0020390 A1   1/2013  Chen
2014/0043163 A1*  2/2014  Yang .................. E05B 73/0052
                                                        340/572.1
2018/0096331 A1*  4/2018  Patil ....................... G07G 1/009

* cited by examiner

CONTROLLING LOCATIONS SHARED AMONG MULTIPLE OPERATORS

BACKGROUND

The present disclosure relates to the information technology field. More specifically, this disclosure relates to the control of shared locations.

The background of the present disclosure is hereinafter introduced with the discussion of techniques relating to its context. However, even when this discussion refers to documents, acts, properties and the like, it does not suggest or represent that the discussed techniques are part of the prior art or are common general knowledge in the field relevant to the present disclosure.

Sharing of resources is a behavioral model that has become very popular in the last years. Indeed, the sharing allows reducing waste of resources, which may instead be used in a co-operative manner by multiple actors; this is of the utmost importance to implement activities that are sustainable (for example, for the environment). Moreover, the sharing allows reducing costs and increasing opportunities; this has a beneficial impact on several economic activities.

SUMMARY

In general terms, the present disclosure is based on the idea of controlling a shared location in a cooperative way.

Particularly, some embodiments provide a method for controlling a shared location. Item identifiers are read from a set of items. A verification request message for the item identifiers is broadcast. A verification response message is received from at least one central computing system. The verification response message indicates a result of a verification for each of the item identifiers. An alarm state is controlled according to the verification response messages.

A further aspect provides a corresponding computer program product.

A further aspect provides a corresponding system.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

FIG. 1A-FIG. 1D illustrate the general principles of the solution according to several embodiments of the present disclosure;

FIG. 2 illustrates a schematic block diagram of an example infrastructure wherein the solution may be implemented according to several embodiments of the present disclosure;

FIG. 3 illustrates the main software components that may be used to implement the solution according to several embodiments of the present disclosure;

FIG. 4 illustrates an activity diagram describing the flow of activities relating to a cash register in an implementation of the solution according to several embodiments of the present disclosure;

FIG. 5 illustrates an activity diagram describing the flow of activities relating to a control device in an implementation of the solution according to several embodiments of the present disclosure;

FIG. 6 illustrates an activity diagram describing the flow of activities relating to a central system in an implementation of the solution according to several embodiments of the present disclosure; and FIG. 7 illustrates a high-level block diagram of an example computer system that may be used in implementing embodiments of the present disclosure.

DETAILED DESCRIPTION

The present disclosure relates to the information technology field. More specifically, this disclosure relates to the control of shared locations.

An example of sharing is the use of a common location by multiple operators. This may be the case of a marketplace wherein multiple sellers offer corresponding products for sale. A commonplace situation is at a trade fair, which gathers a high number of sellers of a variety of types and/or from a variety of places (thereby attracting a huge number of visitors, and then of potential customers).

In trade fairs, as in most individual retail stores of corresponding sellers, the products are generally displayed for sale and directly accessible to the persons visiting the trade fairs, for example, on shelves; this allows the persons to collect the products they want to purchase by themselves (without the need of corresponding staff).

However, this self-service organization exposes the sellers to the risk of unnoticed thefts. Indeed, some persons may take products and leave without paying for them (for example, by concealing the products in pockets or bags). This phenomenon, commonly known as shoplifting, may involve relevant economic losses to the sellers.

Several anti-theft techniques are available for reducing shoplifting at individual retail shops. For example, it is possible to install video surveillance systems, to ban the bringing of bags in the individual retail shops and to disseminate security guards. However, these anti-theft techniques are not completely effective.

In addition or in alternative, Electronic Article Surveillance techniques allow reducing shoplifting at individual retail shops automatically. Particularly, most of these anti-theft techniques are based on security tags that are attached to the products. For example, the security tags may be removed at cash desks of the individual retail shops once the corresponding products have been purchased. Detector systems arranged at gates of the individual retail shops output an alarm whenever a person tries to exit the individual retail shops with any products having their security tags still attached thereto (suggesting that they have not been purchased). In this event, staff of the individual retail shops may perform physical verifications, for example, requesting corresponding purchase receipts. However, theses security tags are relatively expensive, and thus their use is typically limited to valuable products only.

Alternatively, cheaper security tags may be left attached to the products but “deactivated” at the cash desks by dedicated devices. In this case, detector systems read the security tags of all the products carried by the persons exiting the individual retail shops, and they output an alarm whenever any products having their security tags still "active" are found. Typical examples of these security tags are Radio-Frequency Identification (RFID) tags, commonly used for inventory purposes. In this case, the RFID tags may also store identifiers of the corresponding products. Therefore, when any active security tags are detected, the detector systems may also read the identifiers of the corresponding products and output information about them to the staff in charge of the physical verifications (thereby facilitating the operation). However, this typically requires more complex devices at the cash desks (for reading and programming the security tags).

The application of the typical anti-theft techniques to shared locations (such as trade fairs) presents several challenges. The trade fairs are temporary by nature (for example, with several such events generally lasting for a few days only). Moreover, the trade fairs typically have an open-space structure to provide the required dynamicity of their layout from event to event. Therefore, it may be prohibitively expensive (if not impossible) for every seller to put in place its own anti-theft system.

Throughout this disclosure, reference is made to a plurality of "stands," "sellers" and "operators." As an illustrative example, an operator may operate a stand on behalf of a seller associated with the stand. A "stand" refers to a location or structure at which a customer may view or, in some embodiments, purchase one or more goods (such as from a seller who may own or otherwise be associated with the stand). An "operator" refers to a person associated with the stand and/or seller, such as an exhibitor, an employee of a seller, etc. Stands may have more than one operator (for example, a retail seller's stand may have multiple employees operating the stand by processing transactions and assisting customers etc.). The "shared location" described herein includes a plurality of stands.

FIG. 1A-FIG. 1D illustrate general principles of the solution in a shared location 105, according to several embodiments of the present disclosure.

Figure 1A:
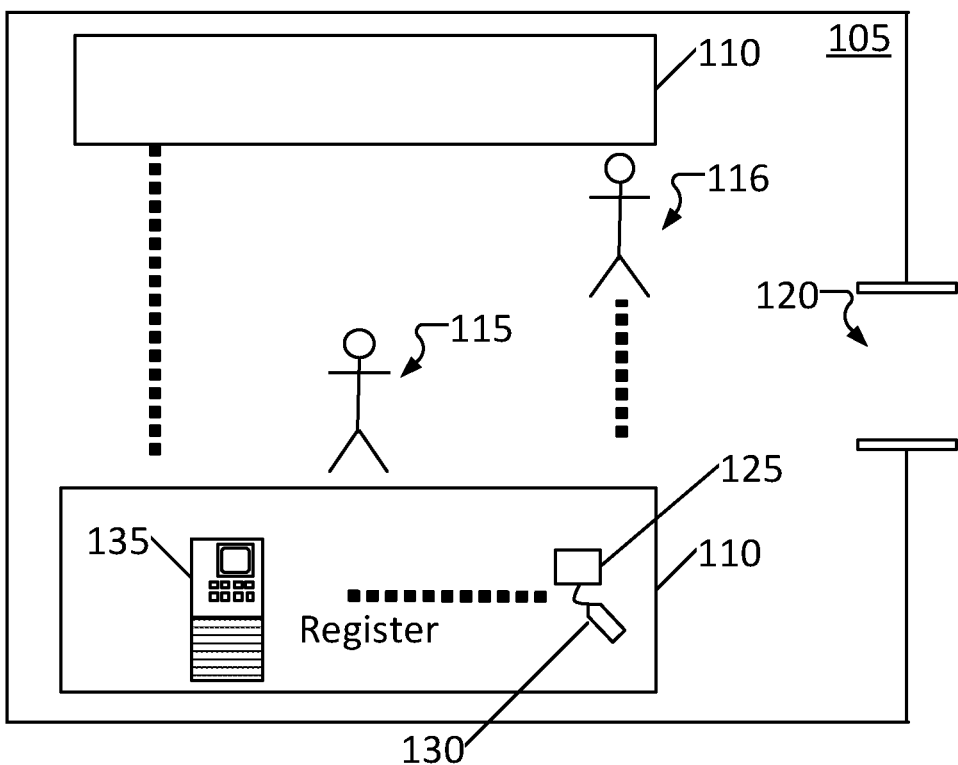

Starting from FIG. 1A, a shared location 105 is shared among a plurality of operators operating stands 110. For example, the shared location 105 may be a market place (such as a building or an enclosure) wherein different trade fairs are held over time (each one lasting over a limited period, for example, of a few days); in this case, the stands 110 are associated with sellers (in other words, sellers are assigned corresponding (temporary) stands 110). The shared location 105 has an open space structure, with no physical boundaries among the stands 110, so that persons 115, 116, etc. visiting the trade fair may move freely. However, the shared location 105 has one or more gates 120 (only one shown in the FIG. 1A-1D); the gate 120 defines the only path through which the persons 115 may exit the shared location 105, otherwise physically closed to prevent the passage of the persons 115, 116, etc. Persons 115, 116, etc. may enter the shared location 105 through the same gate 120 or through other entrances (not shown in FIG. 1A-1D).

Products 125 are for sale by the sellers at their stands 110 (for example, food, garments, electronics, sporting goods, cosmetics, etc.). Corresponding product identifiers are associated with the products 125. In this specific implementation, the product identifiers are stored in RFID tags 130 that are affixed to the products 125. Each RFID tag 130 is a contact-less device in the form of a small label (for example, to be attached outside the products 125) capable of returning information stored therein (in this case, the product identifier) in response to radio signals; the RFID tag 130 is of passive type, being energized by the same radio signals (without the need of any battery).

In some embodiments, whenever a person (such as, for example, one of persons 115, 116, etc.) purchases one or more products 125 from a generic seller's stand 110, this is registered into a central (computing) system 135 of the seller associated with stand 110; for example, the product identifiers of the purchased products 125 are read from the corresponding RFID tags 130 (via an RFID reader, not shown in FIG. 1A) and they are used to update a (private) product repository of the seller associated with stand 110 indicating the products 125 that are for sale by the seller associated with stand 110 and the products 125 that have been sold by the seller associated with stand 110.

Figure 1B:
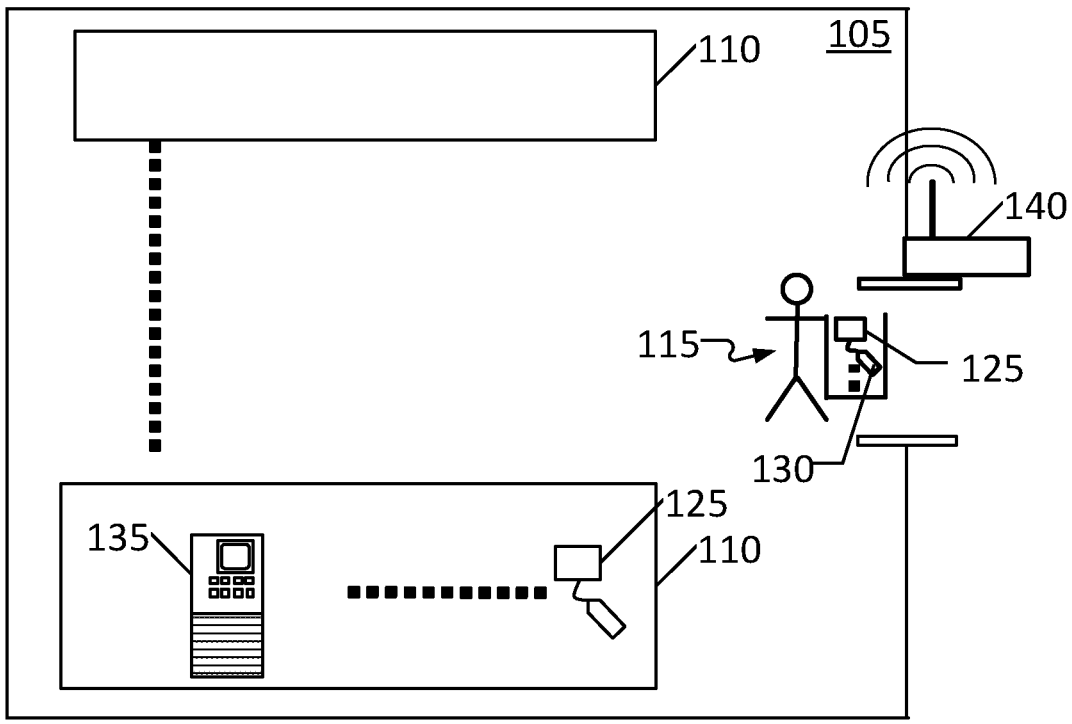

Moving to FIG. 1B, a control (computing) device 140 is arranged at the gate 120. Whenever a (leaving) person 115 carrying a set of one or more products 125 reaches the gate 120, the control device 140 reads the product identifiers associated with these products 125. For example, the control device 140 may include an RFID reader to read from RFID tags 130. The control device 140 then broadcasts one or more verification request messages; a verification request message comprises the product identifiers of the products 125 carried by the person 115. The verification request message has a transmission range large enough to reach the central systems 135 of all the sellers (for example, at their stands 110).

Figure 1C:
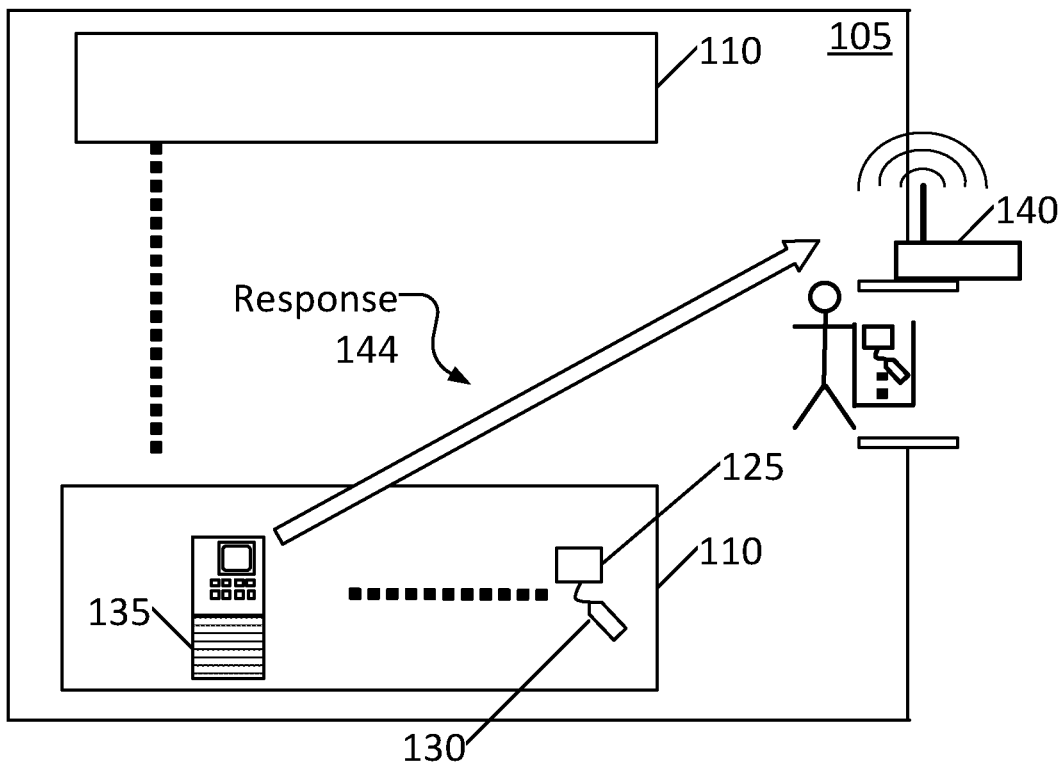

Moving to FIG. 1C, central system 135 receives the verification request message and verifies the product identifiers contained therein; for example, the central system 135 verifies each product identifier against its product repository to determine a corresponding verification result (indicating whether the corresponding product 125 is not for sale by the seller associated with stand 110, it has been sold by the seller associated with stand 110 or it is for sale by the seller associated with stand 110 but it has not been sold). The central system 135 transmits a verification response message 144 to the control device 140. The verification response message comprises the verification results of the product items so determined (at least for its products 125 that have not been sold).

Figure 1D:
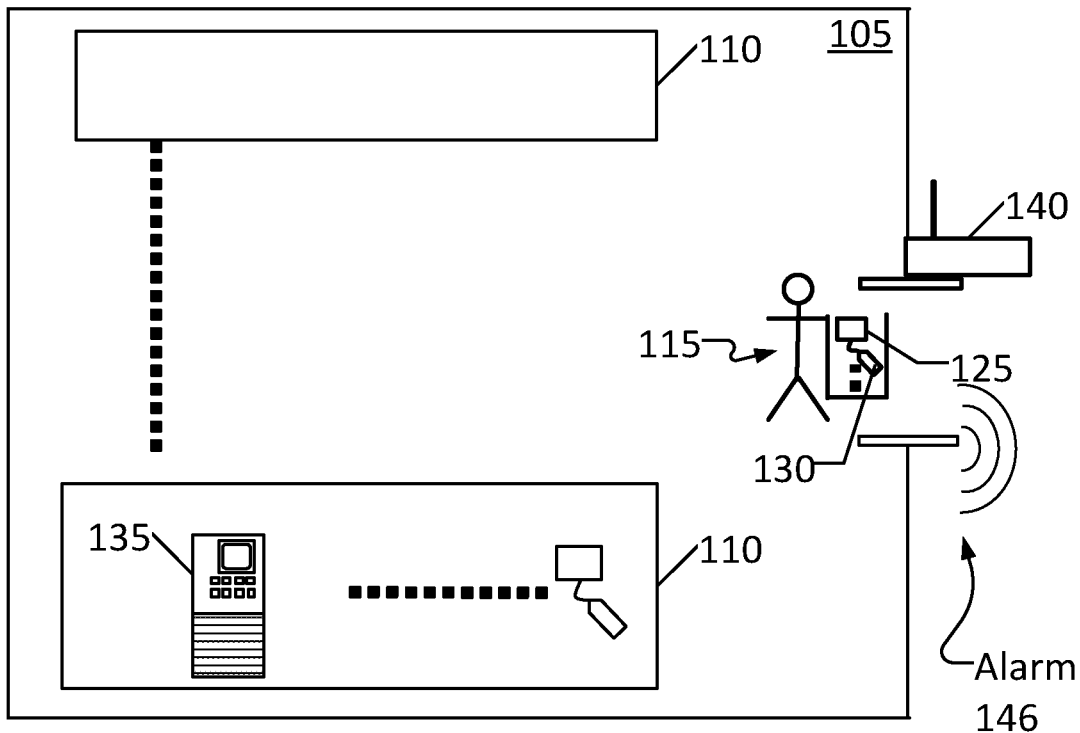

Moving to FIG. 1D, the control device 140 receives the verification response messages 144 from the central systems 135 (or at least part thereof). The control device 140 then controls the passage of the person 115 carrying the products 125 through the gate 120 according to the verification response message. For example, the control device 140 determines a clearance for the person 115 carrying the products 125, which clearance is negative when at least one of these products 125 is for sale by a corresponding seller but it has not been sold or it is positive otherwise; when the clearance is negative, the control device 140 prevents the exit of the person 115; for example, the control device 140 controls an alarm state (e.g., by outputting an alarm 146 for causing a physical inspection of a corresponding purchase receipt by staff of the trade fair present at the gate 120).

The above described solution provides an anti-theft technique that is very effective and at the same time cost effective. Indeed, this can reduce shoplifting in the shared location automatically. The desired result is achieved with (relatively) simple components, since the product identifiers are only to be read (and no programming thereof is required).

All of the above may be implemented "globally" (as in, at the level of the whole shared location for all the sellers). This is achieved without the need of sharing information about the products that are for sale and that have been sold by the different sellers, since the product identifiers may be completely anonymous; therefore, no sensitive information has to be revealed by the sellers to any third parties (particularly allowing determining business offer and selling statistics thereof).

In some embodiments, the control device 140 may broadcast the verification request message without needing any knowledge about the central systems of the sellers; this may advantageously improve scalability.

Figure 2:
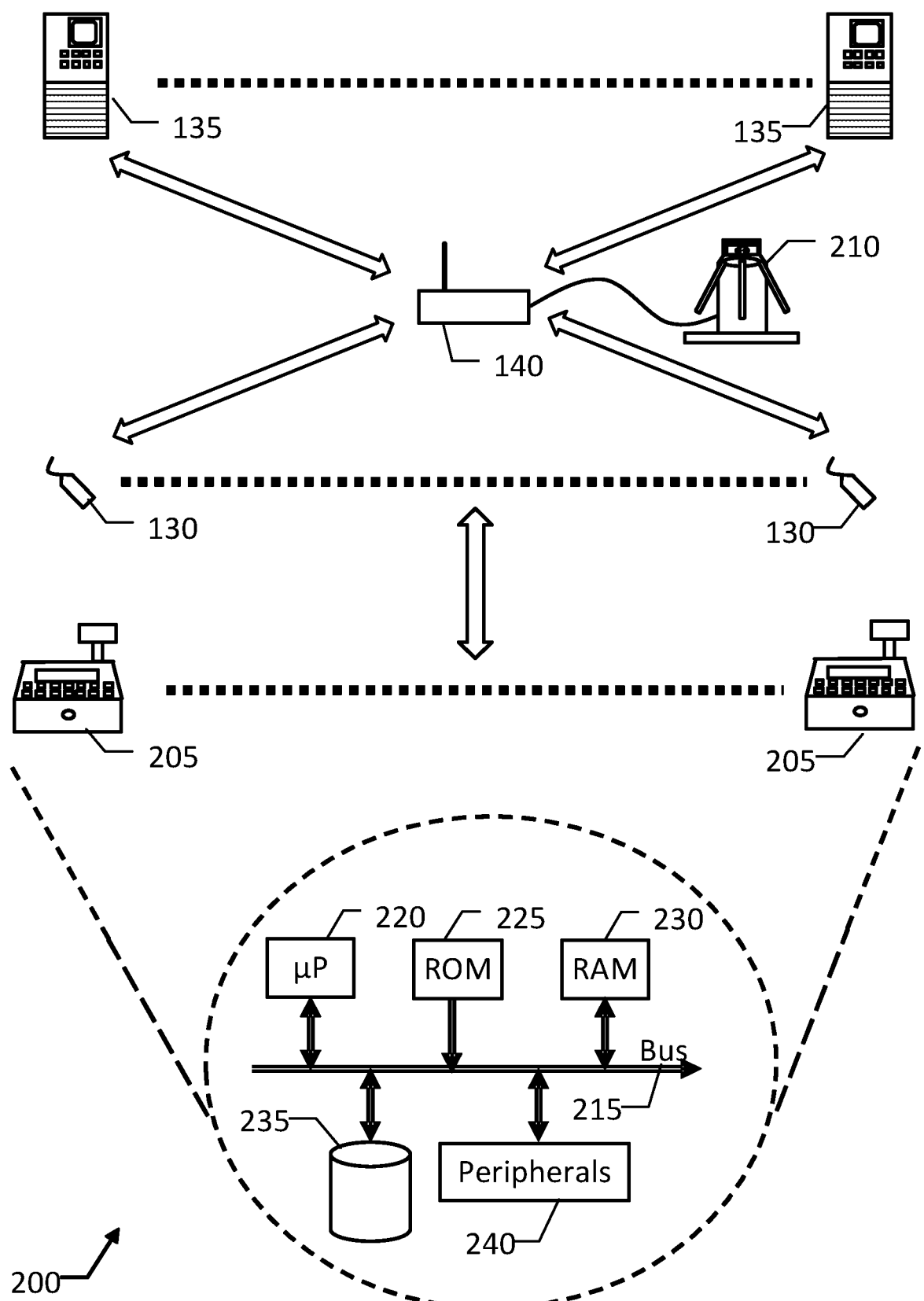

Moving to FIG. 2, a schematic block diagram is shown of an infrastructure 200 wherein the solution according to several embodiments of the present disclosure may be practiced.

The infrastructure 200 comprises a plurality of RFID tags 130 to be attached to the corresponding products, one or more cash registers 205 of each seller (to be arranged at the corresponding stands), a control device 140 or more (to be arranged at each gate of the shared location) and a plurality of central systems 135 of the sellers (to be arranged at the corresponding stands). Moreover, an enforcement device 210 is associated with the control device 140 for enforcing the control of the passage through the gate. For example, enforcement device 210 may be a turnstile, which allows only one person to pass at a time. The turnstile 210 is also provided with a visual/aural warning unit (such as a light and a siren).

Each of the above-described computing machines (i.e., the RFID tags 130, cash registers 205, control device 140 and central systems 135) comprises several units that are connected among them through a bus structure 215 with one or more levels (with an architecture that is suitably scaled according to the type of the computing machine 130, 205, 140, 135). Particularly, one or more microprocessors (μP) 220 provide computing and orchestration capabilities of the computing machine 130, 205, 140, 135; a non-volatile memory (ROM) 225 stores basic code for a bootstrap of the computing machine 130, 205, 140, 135 and a volatile memory (RAM) 230 is used as a working memory by the microprocessors 220. The computing machine 130, 205, 140, 135 is provided with a mass-memory 235 for storing programs and data (for example, a flash EPROM for the RFID tags 130, the cash registers 205 and the control device 140 and a hard-disk for the central systems 135). Moreover, the computing machine 130, 205, 140, 135 comprises a number of controllers for peripherals, or Input/Output (I/O) units, 240. For example, the peripherals 240 of each RFID tag 130 comprise an antenna for receiving/transmitting radio signals, a supply unit for generating electric energy by induction from the radio signals and a modulator/demodulator (Mux/Demux) for modulating/demodulating the radio signals; the peripherals 240 of each cash register 205 comprise an RFID reader for reading the RFID tags 130, a keypad, a display and a network adapter (for example, of wired type, such as Ethernet) for communicating with the central system 135 of the corresponding seller; the peripherals 240 of the control device 140 comprise an RFID reader for reading the RFID tags 130, a network adapter (for example, of wireless type, such as Wi-Fi) for communicating with all the central systems 135 and a drive for reading/writing removable storage units (such as USB keys); the peripherals 240 of each central system 135 comprise a keyboard, a mouse, a monitor, corresponding network adapters for communicating with its cash registers 205 and with the control device 140, respectively, and a drive for reading/writing removable storage units (such as USB keys).

Figure 3:
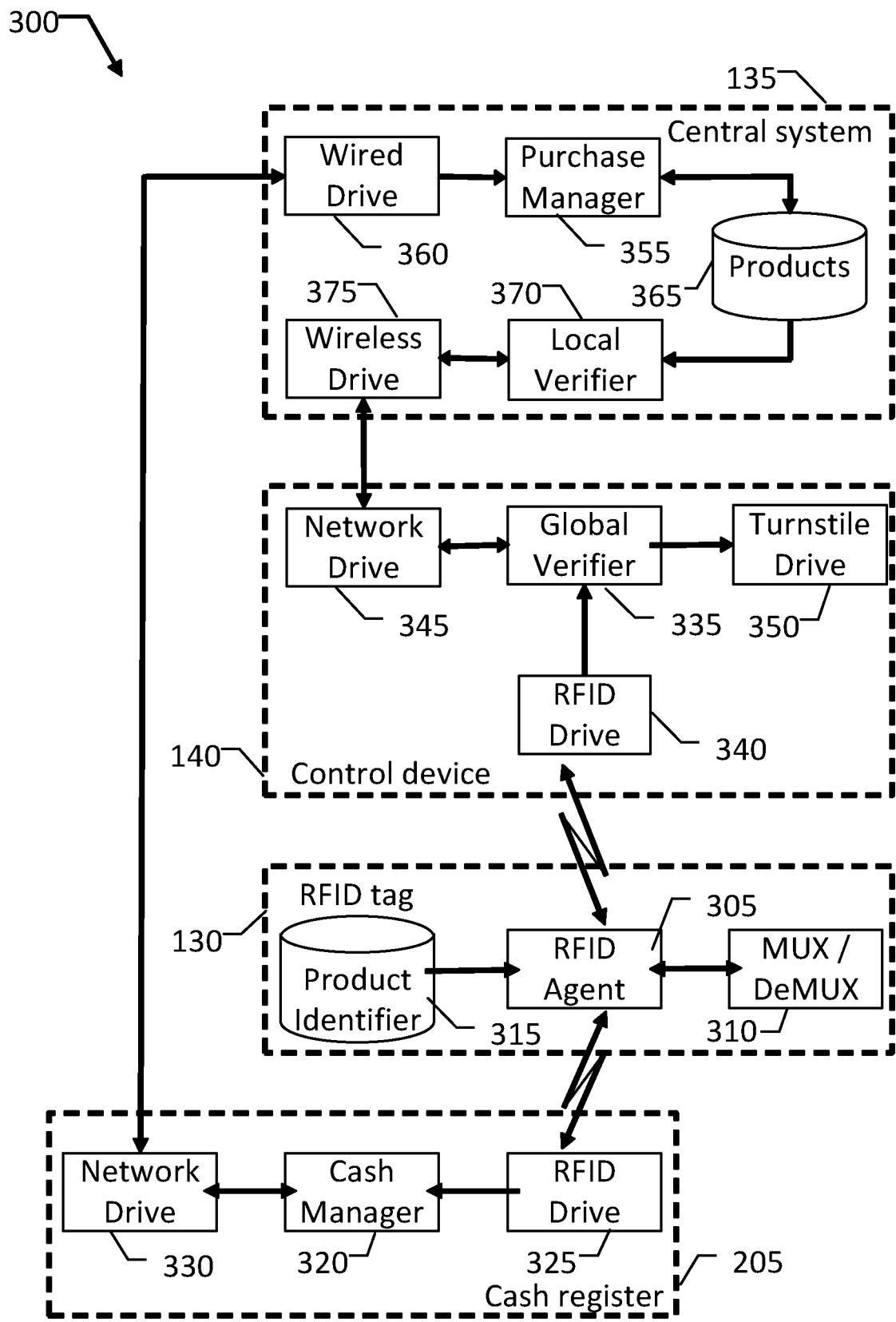

Moving to FIG. 3, the main software components are shown that may be used to implement the solution according to several embodiments of the present disclosure.

The software components 300 are typically stored in the mass memory and loaded (at least in part) into the working memory of each computing machine (RFID tags 130, cash registers 205, control device 140 and central systems 135) when the programs are running. The programs are installed into the mass memory, for example, by pre-loading, reading from removable storage units and/or downloading from a communication network (such as the Internet). In this respect, each program may be a module, segment or portion of code, which comprises one or more executable instructions for implementing the specified logical function.

Starting from each RFID tag 130 (only one shown in FIG. 3), it comprises the following components. An RFID agent 305 controls operation of the RFID tag 130. The RFID agent 305 interfaces with a mux/demux drive 310, which drives the modulator/demodulator. The RFID agent 305 accesses (in read mode) a register 315 storing the corresponding product identifier. The product identifier is unique (at least for the products of the corresponding seller) and it is anonymous (i.e., unrelated to the corresponding seller, meaning that it is impossible, or at least prohibitively difficult, to infer the seller from the product identifier). For example, the product identifier is a factory-assigned (worldwide unique) serial number of the RFID tag 130; alternatively, when the RFID tag is programmable as well (such as write-once), the product identifier may be a (pseudo) random number that is generated and written into a blank RFID tag by the seller (via an RFID read/write station).

FIG. 3 also depicts the components of one of cash registers 205. A cash manager 320 manages purchases that are performed at a corresponding cash desk. The cash manager 320 exploits an RFID drive 325, which drives the corresponding RFID reader (for reading the RFID tags 130). Moreover, the cash manager 315 interfaces with a network drive 330, which drives the corresponding network adapter (for communicating with the central system 135 of the seller).

Moving to the control device 140, it comprises the following components. A global verifier 335 verifies the products carried by each person that is going to exit the shared location through the gate. The global verifier 335 exploits an RFID drive 340, which drives the corresponding RFID reader (for reading the RFID tags 130). Moreover, the global verifier 335 exploits a network drive 345, which drives the corresponding network adapter (for communicating with all the central systems 135). In embodiments with a turnstile, the global verifier 335 controls a turnstile drive 350, which drives the turnstile.

Moving to each central system 135 (only one shown in the figure), it comprises the following components. A purchase manager 355 manages the purchases that are performed at the stand of the seller. The purchase manager 355 interfaces with a wired network drive 360. The wired network drive 360 drives the wired network adapter, which communicates with the network drive 330 of all the cash registers 205 of the seller. The purchase manager 355 accesses (in read/write mode) a product repository 365. The product repository 365 indicates the products that are for sale by the seller and the products that have been sold by the seller. For example, the product repository 365 comprises an entry for each product for sale; the entry stores a description of the product, its price, its product identifier and a sale flag. The sale flag is deasserted when the product is still to be sold and asserted once the product has been sold. A local verifier 370 responds to the verification request messages submitted by the control device 140. The local verifier interfaces with a wireless network drive 375. The wireless network drive 375 drives the wireless network adapter, which communicates with the network drive 345 of the control device 140. Moreover, the local verifier 370 accesses (in read mode) the product repository 365.

Figure 4:
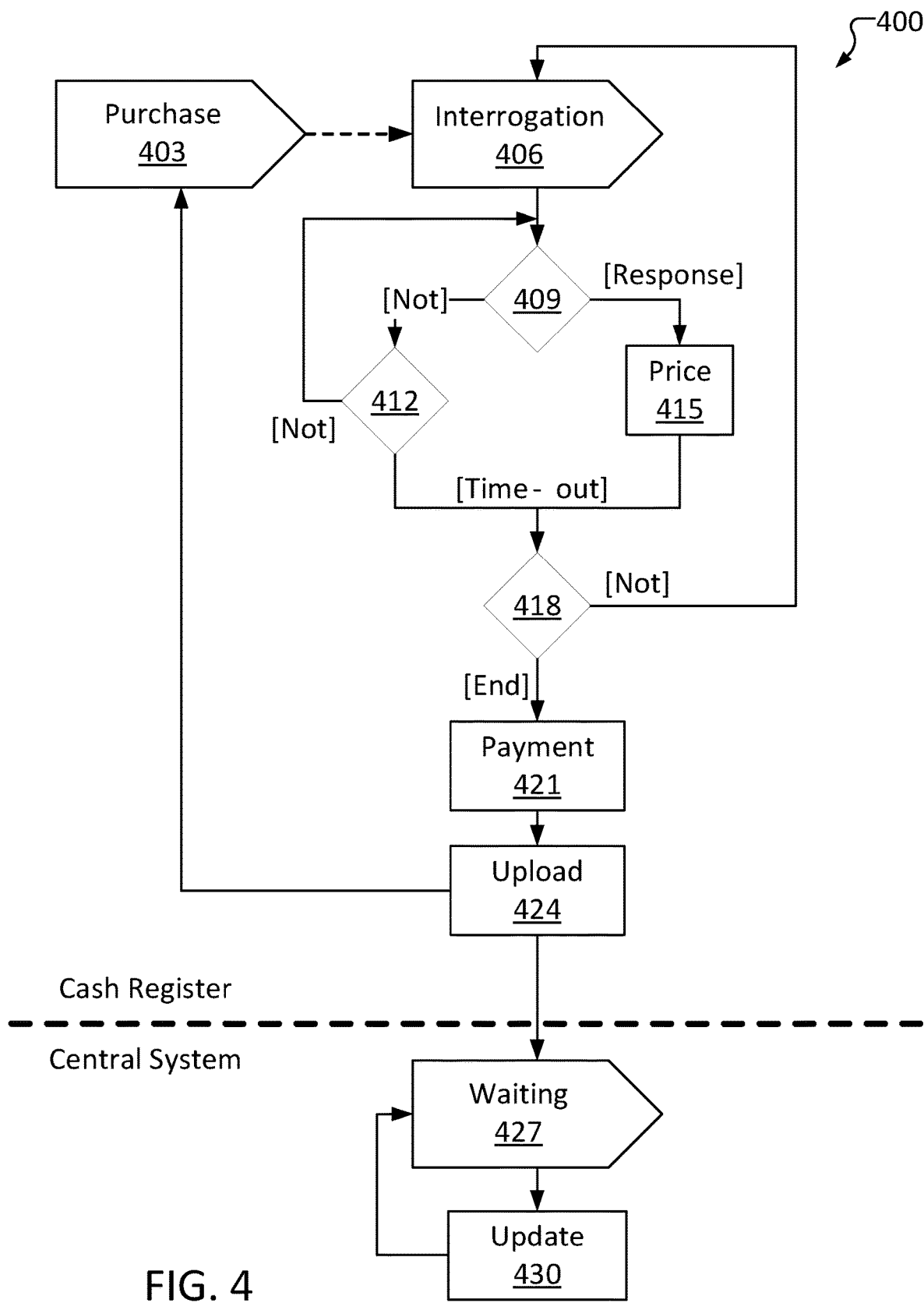

FIG. 4 illustrates an activity diagram describing the flow of activities relating to a cash register in an implementation of the solution according to several embodiments of the present disclosure.

Particularly, the activity diagram represents an exemplary process that may be used to control the shared location (and particularly to implement an anti-theft technique for all its sellers) with a method 400. In this respect, each block may correspond to one or more executable instructions for implementing the specified logical function on each workstation.

Starting from the swim-lane of a generic cash register, the process passes from block 403 to block 406 (in response to a manual command, for example, entered by an operator of the cash register with its keypad) whenever a person purchases one or more products at the stand of the corresponding seller. At this point, the RFID drive of the cash register broadcasts an (RFID) interrogation signal (for example, a radio wave with a frequency of some GHz) with a very short operating range around a product tray associated with the cash register (such as a few cm). The process then enters a waiting loop for any (RFID) response signal to the interrogation signal. Particularly, the RFID drive at block 409 verifies whether a response signal has been received. If not, the RFID at block 412 verifies whether a time-out has expired from the broadcast of the interrogation signal (for example, 0.5-1.0 s). If not, the process returns to the block 409 to repeat the same operations continually. Conversely, if the operator has placed a product to be purchased onto the tray, its RFID tag is within the operating range of the interrogation signal which then energized it. Particularly, the supply unit transforms the interrogation signal received with the antenna into electric energy by electromagnetic induction, which electric energy supplies the microprocessor. The modulator/demodulator demodulates the interrogation signal, the processor verifies it and generates a corresponding (RFID) response signal, and the modulator/demodulator modulates the response signal so as to cause the antenna to broadcast it (for example, a radio wave with a frequency from 100 Hz to 10 GHz and an operating range similar to that of the interrogation signal), after that the microprocessor automatically turns off. In this case, the response signal comprises the product identifier being read by the processor from the mass memory. Therefore, the RIFD drive now receives the response signal.

In response thereto, the process passes from the block 409 to block 415. At this point, the cash manager extracts the product identifier (passed by the RFID drive) from the response signal and downloads (via the network drive) the description and the price of the product from the central system of the seller (retrieved from the product repository according to the product identifier). The cash manager displays the description and the price of the product onto the display of the cash register; at the same time, the cash manager adds this information to a purchase list (initially empty) and it updates a total amount of the purchase accordingly (initialized to zero) in corresponding variables.

The waiting loop is then exited into block 418; the same point is also reached directly from the block 412 if the time-out has expired (with no response signal being received). If the purchase is going on (e.g., all purchased items have not been processed), the process returns to the block 406 to repeat the same operations continually. Conversely, as soon as the purchase has been completed (in response to a manual command, for example, again entered by the operator with the keypad) the process proceeds to block 421. The cash manager now displays the total amount onto the display. In some embodiments, the cash manager prints a corresponding purchase receipt (listing the products that have been purchased with their description/price and the total amount that has been paid, retrieved from the corresponding variables) once the person has paid for the purchase (for example, by cash, credit/debit card and so on). The cash manager at block 424 uploads a sale report to the central system (via the network drive); the sale report comprises the product identifiers of all the products that have been purchased (extracted from the purchase list in the corresponding variable). The process then returns to the block 403 waiting for a next purchase.

Moving to the swim-lane of a generic central system, the purchase manager is in a waiting condition at block 427 for any sale report (from the cash registers of the seller). As soon as a sale report is received (via the wired network drive), the purchase manager at block 430 updates the product repository accordingly. Particularly, the purchase manager asserts the sale flags associated with all the product identifiers indicated in the sale report. The process then returns to the block 427 waiting for a next sale report.

Figure 5:
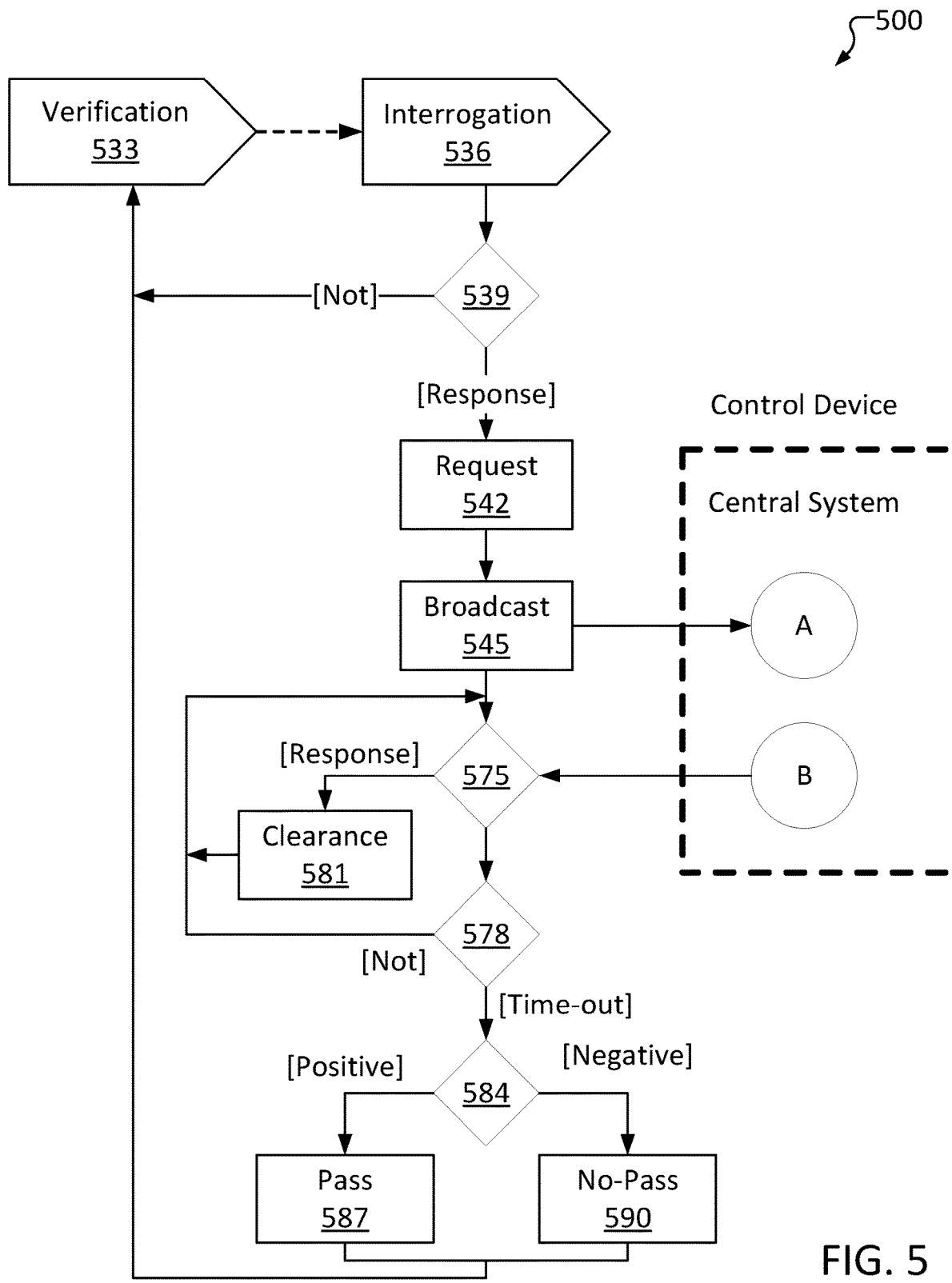

FIG. 5 illustrates an activity diagram describing the flow of activities relating to a control device in an implementation of the solution according to several embodiments of the present disclosure.

Particularly, the activity diagram represents an exemplary process that may be used to control the shared location (and particularly to implement an anti-theft technique for all its sellers) with a method 500. In this respect, each block may correspond to one or more executable instructions for implementing the specified logical function on each workstation.

Method 500 includes passing from block 533 to block 536 in the swim-lane of the control device as soon as a verification period expires (for example, every 0.1-1.0 s). In response thereto, the RFID drive broadcasts an (RFID) interrogation signal as above but with a relatively larger operating range (such as a few meters) so as to cover the whole gate. The RFID drive at block 539 verifies whether any (RFID) response signal has been received. If not, it means that no product (with its RFID tag) is around the gate; the process returns to the block 533 to repeat the same operations continually (or periodically). Conversely, if a person carrying one or more products has reached the gate, their RFID tags are within the operating range of the interrogation signal which energizes them. Therefore, as above these RFID tags broadcast corresponding (RFID) response signals comprising the product identifiers of their products. Therefore, the RIFD drive receives the response signals at block 539; in response thereto, the process passes from the block 539 to block 542. At this point, the global verifier extracts the product identifiers (passed by the RFID drive) from the response signals and generates a corresponding verification request message comprising them. The verification manager at block 545 broadcasts the verification request message (via the network drive) for all the central systems.

Method 500 further includes entering a waiting loop from the block 545 for verification response messages from the central systems. Particularly, the network drive at block 575 verifies whether any verification response message has been received. If not, the network drive at block 578 verifies whether a time-out has expired from the broadcast of the verification request message; the time-out corresponds to the time normally required to respond to the verification request message by the central systems (for example, 0.5-1.0 s). If the time-out has not expired, the process returns to the block 575 to repeat the same operations continually. Referring again to the block 575, if a verification response message (or more) has been received, the global verifier at block 581 updates a clearance of the person accordingly in a corresponding variable (initialized to positive); particularly, if the verification response message comprises one or more negative verification responses, the global verifier sets the clearance to negative, with the addition of the description of the corresponding products extracted therefrom. The process again returns to the block 575 to repeat the same operations continually.

Referring back to the block 578, as soon as the time-out expires the waiting loop is exited by proceeding to block 584 to analyze the clearance obtained (or not obtained) in block 581. If the clearance is positive (meaning that all the products carried by the person have been purchased), the person at block 587 is allowed to pass through the gate. For example, the global verifier commands the turnstile drive to switch on a green light of its warning unit and to open the turnstile. Conversely, if the clearance is negative (meaning that one or more products carried by the person have not been purchased), the person should be prevented from passing through the gate at block 590. For example, the global verifier may command the turnstile drive to output an alarm, such as switching on the siren and a blinking red light of its warning unit. The global verifier may also command the turnstile to maintain the turnstile closed. The warning unit may also display the description of the products indicated in the variable of the clearance. In this event, staff of the trade fair may perform a physical verification, for example, requesting purchase receipts of the products at issue to the person (operation further facilitated by the information being displayed about these products). In both cases, the process then returns to the block 534 waiting for the expiration of a next verification period.

In some embodiments, a default behavior inherently treat a clearance as positive unless a message is received directly contradicting this. For example, if no message is received prior to a time-out, the person may be allowed to pass.

Figure 6:
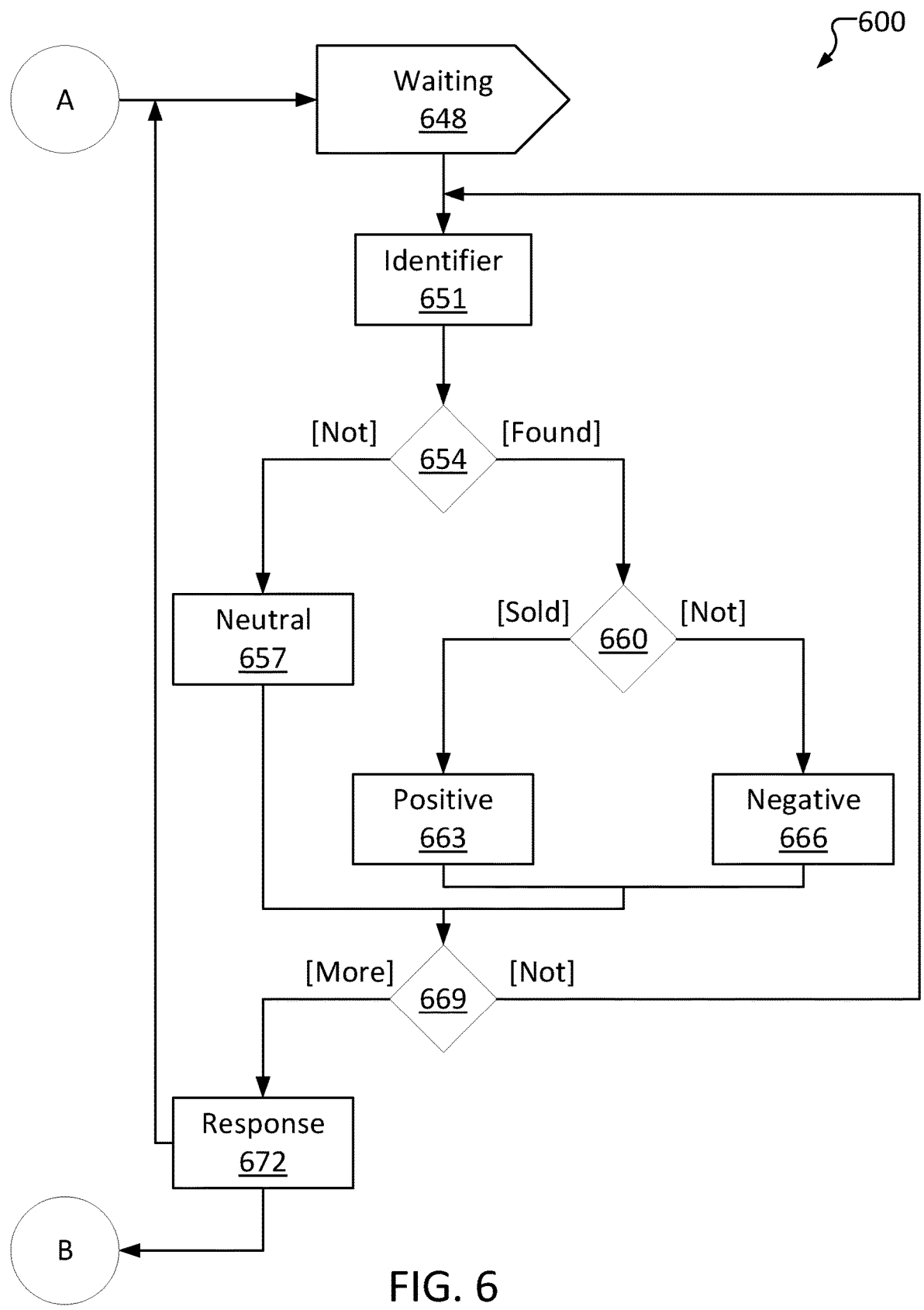

FIG. 6 illustrates an activity diagram describing the flow of activities relating to a central system in an implementation of the solution according to several embodiments of the present disclosure.

Particularly, the activity diagram represents an exemplary process that may be used to control the shared location (and particularly to implement an anti-theft technique for all its sellers) with a method 600. In this respect, each block may correspond to one or more executable instructions for implementing the specified logical function on each workstation.

The local verifier is in a waiting condition at block 648 for any verification request message (from the control device). As soon as a verification request massage is received (via the wireless network drive), the process enters a loop for processing the product identifiers extracted from the verification request message. The loop begins at block 651, wherein the local verifier takes a (current) product identifier into account (starting from a first one in any arbitrary order). The local verifier at block 654 looks for the product identifier in the product repository. If the product identifier is not found, the process continues to block 657; in this case, the local verifier may set a verification result for the product identifier to neutral (meaning that the corresponding product is not for sale by the corresponding seller) and add it to a verification response message (initially empty). In some embodiments, in response to failing to find the product identifier in the product repository, the local verifier may simply do nothing, (e.g., block 657 may be omitted and operations may instead proceed directly to block 669).

If the product identifier is found, the flow of activity branches at block 660 according to the corresponding sale flag (extracted from the product repository). If the sale flag is asserted, the local verifier at block 663 may set the verification result for the product identifier to positive (meaning that the product has been sold by the seller) and add it to the verification response message. In some embodiments, in response to finding that the sale flag is asserted, the local verifier may simply do nothing (e.g., block 663 may be omitted and operations may instead proceed directly to block 669). Conversely, if the sale flag is deasserted, the local verifier at block 666 sets the verification result for the product identifier to negative (meaning that the product is for sale by the seller but it has not been sold) and adds it to the verification response message together with the description of the corresponding product (extracted from the product repository). The flow of activity merges again at block 669 from the block 657, the block 663 or the block 666. The local verifier then verifies whether a last product identifier has been processed at block 669. If not, the process returns to the block 651 to repeat the same operations on a next product identifier. Conversely, as soon as all the product identifiers have been processed, the above-described loop is exited and the local verifier at block 672 transmits the verification response message so obtained to the control device (via the wireless network drive). The process then returns to the block 648 to await a next verification request message.

Figure 7:
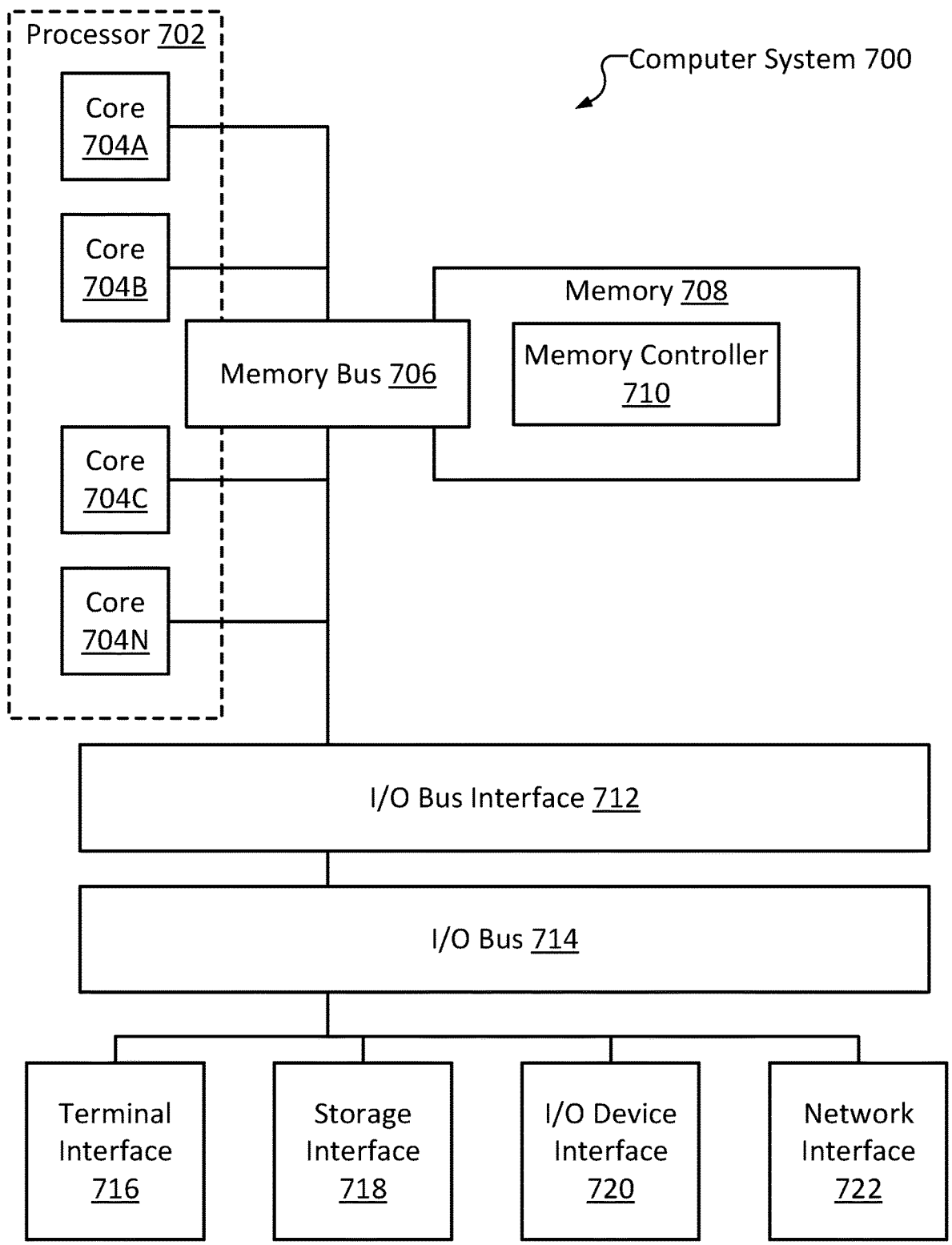

Referring now to FIG. 7, shown is a high-level block diagram of an example computer system 700 that may be configured to perform various aspects of the present disclosure, including, for example, methods 400, 500 and 600, respectively. The example computer system 700 may be used in implementing one or more of the methods or modules, and any related functions or operations, described herein (e.g., using one or more processor circuits or computer processors of the computer), in accordance with embodiments of the present disclosure. In some embodiments, the major components of the computer system 700 may comprise one or more CPUs 702, a memory subsystem 708, a terminal interface 716, a storage interface 718, an I/O (Input/Output) device interface 720, and a network interface 722, all of which may be communicatively coupled, directly or indirectly, for inter-component communication via a memory bus 706, an I/O bus 714, and an I/O bus interface unit 712.

The computer system 700 may contain one or more general-purpose programmable central processing units (CPUs) 702, some or all of which may include one or more cores 704A, 704B, 704C, and 704D, herein generically referred to as the CPU 702. In some embodiments, the computer system 700 may contain multiple processors typical of a relatively large system; however, in other embodiments the computer system 700 may alternatively be a single CPU system. Each CPU 702 may execute instructions stored in the memory subsystem 708 on a CPU core 704 and may comprise one or more levels of on-board cache.

In some embodiments, the memory subsystem 708 may comprise a random-access semiconductor memory, storage device, or storage medium (either volatile or non-volatile) for storing data and programs. In some embodiments, the memory subsystem 708 may represent the entire virtual memory of the computer system 700 and may also include the virtual memory of other computer systems coupled to the computer system 700 or connected via a network. The memory subsystem 708 may be conceptually a single monolithic entity, but, in some embodiments, the memory subsystem 708 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 702. This may include a memory controller 710.

Although the memory bus 706 is shown in FIG. 7 as a single bus structure providing a direct communication path among the CPU 702, the memory subsystem 708, and the I/O bus interface 712, the memory bus 706 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 712 and the I/O bus 714 are shown as single respective units, the computer system 700 may, in some embodiments, contain multiple I/O bus interface units 712, multiple I/O buses 714, or both. Further, while multiple I/O interface units are shown, which separate the I/O bus 714 from various communications paths running to the various I/O devices, in other embodiments some or all of the I/O devices may be connected directly to one or more system I/O buses.

In some embodiments, the computer system 700 may be a multi-user mainframe computer system, a single-user system, or a server computer or similar device that has little or no direct user interface but receives requests from other computer systems (clients). Further, in some embodiments, the computer system 700 may be implemented as a desktop computer, portable computer, laptop or notebook computer, tablet computer, pocket computer, telephone, smart phone, mobile device, or any other appropriate type of electronic device.

It is noted that FIG. 7 is intended to depict the representative major components of an exemplary computer system 700. In some embodiments, however, individual components may have greater or lesser complexity than as represented in FIG. 7, components other than or in addition to those shown in FIG. 7 may be present, and the number, type, and configuration of such components may vary.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order to not obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially," "about," "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, some embodiments may provide a method for controlling a shared location being shared among a plurality of operators. However, the shared location may comprise one of several types (for example, a building, an enclosure, a park, a station, a mall and so on for a fair, an exhibition, a carnival, an event and so) and it may be shared among any number and type of operators (for example, sellers, artists, attractions and so on).

In some embodiments, the shared location has at least one gate for exiting and/or entering the shared location. However, the gates may be in any number and of any type otherwise consistent with the embodiments of this disclosure (for example, one-directional, only for entering or for exiting, bi-directional, free-walking, with any physical barriers and so on).

In some embodiments, the method comprises the following operations being performed by at least one corresponding control computing device arranged at the gate. However, the control computing device may be of any type otherwise consistent with the embodiments of this disclosure (see below); the control computing devices may be in any number otherwise consistent with the embodiments of this disclosure (for example, one for each gate, one for two or more gates, and so on) and at any position otherwise consistent with the embodiments of this disclosure (for example, integrated in the gates, hardwired to the gates, coupled with the gates by wireless communication and so on).

In some embodiments, the method comprises reading corresponding item identifiers from a set of one or more items (pertaining to one or more of the operators) reaching the gate. However, the set may comprise any number and type of items otherwise consistent with the embodiments of this disclosure (for example, products, tickets and so on) reaching the gate in any way otherwise consistent with the embodiments of this disclosure (for example, carried by a person, transported automatically and so on). The items may pertain to any number of operators in any way otherwise consistent with the embodiments of this disclosure (for example, products for sale by them, services offered by them and so on). The item identifiers may be of any type otherwise consistent with the embodiments of this disclosure (for example, random numbers, serial numbers, product/service codes and so on) and they may be provided by the items in any way otherwise consistent with the embodiments of this disclosure (for example, from associated security tags, codes printed on packages and so on). The item identifiers may be read in any way otherwise consistent with the embodiments of this disclosure (for example, automatically or manually, via radio, optically and so on).

In some embodiments, the method comprises broadcasting at least one verification request message comprising the item identifiers for a plurality of corresponding central computing systems of the operators. However, the verification request messages may be in any number and of any type otherwise consistent with the embodiments of this disclosure (for example, a single one for the whole set of items, one for each number of items, down to a single one, and so on). The verification request messages may be broadcast in any way otherwise consistent with the embodiments of this disclosure (for example, transmitted via radio, injected into a wireless/wired network and so on) for any number and type of central computing systems otherwise consistent with the embodiments of this disclosure (see below).

In some embodiments, the method comprises receiving one or more verification response messages in response to the verification request message. However, the verification response messages may be received in any way otherwise consistent with the embodiments of this disclosure (either the same or different with respect to the broadcasting of the verification request message).

In some embodiments, at least one of the verification response messages is received from each of at least part of the central computing systems. However, the verification response messages may be received from any number of central computing systems otherwise consistent with the embodiments of this disclosure (for example, waiting until received from all of them, waiting only for a pre-defined period and so on); the verification response messages from each central computing system may be in any number and of any type otherwise consistent with the embodiments of this disclosure (for example, a single one for the whole set of items or one for any number of items down to a single one, either the same or different with respect to the verification request messages, and so on).

In some embodiments, the verification response message indicates a result of a verification of each of the item identifiers pertaining to the operator of the central computing system. However, the verification response message may indicate the result of the verification in any way otherwise consistent with the embodiments of this disclosure (for example, individually for each item identifier or globally for all of them, indicating only the (negative or negative/positive) result of the verification of the pertaining item identifiers or the non-pertaining item identifiers as well, with the verification response message that is provided always or only when the result of the verification is negative, with or without additional information, such as a description of the relevant items, and so on).

In some embodiments, the method comprises controlling a passage of the items through the gate according to the verification response messages. However, the passage may be controlled in any way otherwise consistent with the embodiments of this disclosure (for example, automatically or manually, always or with random verification, outputting an alarm and/or maintaining closed the gate when the result of the verification of at least one item identifier is negative, doing nothing, outputting a message of thanks and/or opening the gate otherwise, and so on). The passage through the gate may be controlled for exiting (for example, to prevent shoplifting of products for sale in the shared location) and/or entering (for example, to prevent gatecrashing at multi-events in the shared location).

Further embodiments provide additional advantageous features, which may however be omitted in a basic implementation.

Particularly, in some embodiments the item identifiers are unrelated to the corresponding operators. However, this result may achieved in any way otherwise consistent with the embodiments of this disclosure (for example, with random numbers, serial numbers and so on); in any case, the possibility is not excluded of using item identifiers correlated with the operators (for example, when there are no confidentiality concerns).

In some embodiments, the item identifiers are random (potentially including pseudorandom) numbers. However, the random numbers may be of any type otherwise consistent with the embodiments of this disclosure (for example, unique globally for all the operators or individually for each operator, and so on). Particularly, the possibility is not excluded of having items of different operators with the same item identifiers; indeed, in this case as well each of them may be verified by clearing the corresponding item as soon as the result of its verification is positive for a central computing system (even if it is negative for one or more other central computing systems).

In some embodiments, the operators are employees of sellers. However, the operators may be of any type otherwise consistent with the embodiments of this disclosure (for example, exhibitors, temporary merchants and so on).

In some embodiments, the items are products for sale by the sellers in the shared location and the item identifiers are product identifiers. However, the products may be of any type otherwise consistent with the embodiments of this disclosure (for example, partial, different and additional products with respect to the ones mentioned above, either individually or in any combination thereof).

In some embodiments, the method comprises controlling an exit through the gate of each person reaching the gate with the products according to the verification response messages. However, the exit may be controlled in any way otherwise consistent with the embodiments of this disclosure (for example, allowing/preventing it, involving a physical verification of purchase receipts by staff of the shared location in case of possible shoplifting and so on).

In some embodiments, the method comprises reading the product identifiers from corresponding RFID tags associated with the products. However, the RFID tags may be of any type otherwise consistent with the embodiments of this disclosure (for example, attached to the products, embedded therein, of read only type, read and one-time/multi-time write type, working at any frequency, with any operating range and so on). However, the possibility is not excluded of using different security tags otherwise consistent with the embodiments of this disclosure (for example, NFC, magnetic, optic and so on).

In some embodiments, the method comprises receiving the verification response messages each comprising a verification result of each of the product identifiers being positive when the product has been sold by the seller, neutral when the product is not for sale by the seller or negative when the product is for sale by the seller and has not been sold by the seller. However, the verification result may be indicated in any way otherwise consistent with the embodiments of this disclosure (for example, by numbers, codes and so on); in any case, the possibility is not excluded of having the verification result only positive/negative or only negative (and missing otherwise).

In some embodiments, the method comprises determining a clearance for the person being negative when at least one of the verification results is negative or being positive otherwise. However, the clearance of the person may be determined in any way otherwise consistent with the embodiments of this disclosure (for example, negative for each item identifier as soon as a verification result is so, only when all the other verification results are neutral, and so on).

In some embodiments, the method comprises controlling the exit of the person according to the clearance. However, the exit may be controlled in any way otherwise consistent with the embodiments of this disclosure according to the clearance (see above).

In some embodiments, the method comprises outputting an alarm for causing a physical inspection of a purchase receipt of the products corresponding to the verification results being negative in response to the clearance being negative. However, the alarm may be of any type otherwise consistent with the embodiments of this disclosure (for example, visual, aural, both of them, generic or with information about the products that have not been sold, and so on).

In some embodiments, the method comprises opening an enforcement device controlling the passage through the gate in response to the clearance being positive. However, the enforcement device may be of any type otherwise consistent with the embodiments of this disclosure (see below) and it may be opened in any way otherwise consistent with the embodiments of this disclosure (for example, by unlocking or removing any barrier, and so on).

In some embodiments, the method comprises determining (by each of the central computing systems) the corresponding verification response message by verifying each of the product identifiers against a product repository of the seller indicating products being for sale by the seller and each of the corresponding products being sold by the seller. However, the product repository may be of any type otherwise consistent with the embodiments of this disclosure (for example, a database, a file and so on). The product repository may store any information otherwise consistent with the embodiments of this disclosure about the products of the seller (for example, with entries for all the products for sale with corresponding sale flags, only for the products that are still to be sold, with or without additional information, such as their descriptions, prices, possible dates of sale and the like, stored locally or remotely, and so on).

In some embodiments, the method comprises receiving (by each of the central computing systems) sale reports from one or more cash computing devices of the corresponding seller. However, the cash computing devices of each seller may be in any number and of any type otherwise consistent with the embodiments of this disclosure (for example, cash registers, customized computers, associated with manual/automatic cash desks and so on). The sale reports may be received in any way (for example, via a wireless or wired connection, over a physical/virtual private network, over a public network in encrypted form and so on).

In some embodiments, each of the sale reports indicates the product identifiers of one or more of the products of the seller being sold. However, the sale report may be of any type otherwise consistent with the embodiments of this disclosure (for example, only listing the product identifiers of the products that have been sold, with possible additional information such as a type of payment, an identifier of a fidelity card of the person, and so on).

In some embodiments, the method comprises updating (by each of the central computing systems) the product repository of the seller according to each of the sale reports received from the corresponding cash computing devices. However, the product repository may be updated in any way otherwise consistent with the embodiments of this disclosure (for example, asserting the sale flags or removing the product identifiers of the products that have been sold, and so on).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

Some embodiments provide a computer program that is configured for causing a computing machine to perform the above-mentioned method. Some embodiments provide a computer program product for controlling a shared location. The computer program product comprises a computer readable storage medium that has program instructions embodied therewith. The program instructions are executable by a computing machine to cause the computing machine to perform the same method. However, the computer program may be implemented as a stand-alone module, as a plug-in for a pre-existing software program (for example, a control program of the gate) or directly therein. Moreover, the computer program may be executed on any computing machine otherwise consistent with the embodiments of this disclosure (for example, a single control computing device, a complex comprising one or more control computing devices and one or more central computing systems and/or one or more cash computing devices). In any case, the solution according to some embodiments of the present disclosure lends itself to be implemented even with a hardware structure (for example, by electronic circuits integrated in one or more chips of semiconductor material), or with a combination of software and hardware suitably programmed or otherwise configured.

Some embodiments provide a system comprising means that are configured for performing the steps of the above-described method. Some embodiments provide a system comprising a circuit (i.e., any hardware suitably configured, for example, by software) for performing each step of the above-described method. However, the system may be of any type otherwise consistent with the embodiments of this disclosure (for example, a single control computing device of any type, such as a microcontroller, a PC and the like, a complex comprising one or more control computing devices with the addition of one or more enforcement devices, such as turnstiles, doors and the like, one or more central computing systems, such as PCs, servers and the like, and/or one or more cash computing devices, such microcontrollers, PCs and the like, communicating among them over any network exploiting any wired/wireless connection).

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The invention claimed is:

1. A method comprising:
reading, by at least one control computing device, item identifiers from a set of one or more items;
broadcasting, by the control computing device, at least one verification request message comprising the item identifiers to two or more central computing systems, each central computing system belonging to a different seller;
receiving, by the control computing device, one or more verification response messages from at least one central computing system, the verification response message indicating a result of a verification for each of the item identifiers; and
controlling, by the control computing device, an alarm state according to the verification response messages.

2. The method of claim 1, wherein the item identifiers are anonymized.

3. The method of claim 2, wherein the item identifiers are random numbers.

4. The method of claim 1, wherein the items are products for sale by sellers in a shared location, the shared location having at least one gate for exiting the shared location, and the item identifiers are product identifiers, the method further comprising:
controlling, by the control computing device and based on the verification response messages, an exit through the gate of one or more persons reaching the gate with the products.

5. The method of claim 4, wherein the method comprises:
reading, by the control computing device, the product identifiers from RFID tags associated with the products.

6. The method of claim 4, wherein the method comprises:
determining, by the control computing device based on at least one of the one or more verification response messages, that one or more of the products has not been sold;
determining, by the control computing device, a clearance for the person being negative based on at least one of the verification results indicating that one or more of the products has not been sold; and
controlling, by the control computing device, an exit of the person according to the clearance.

7. The method of claim 6, wherein the controlling comprises outputting, by the control computing device, an alarm for causing a physical inspection of a purchase receipt of the one or more products that have not been sold.

8. The method of claim 4, wherein the method comprises:
determining, by the control computing device based on at least one of the one or more verification response messages, that none of the products have not been sold;
determining, by the control computing device, a clearance for the person being positive when none of the verification results indicate that one or more of the products have not been sold; and
opening, by the control computing device, an enforcement device controlling the passage through the gate in response to the clearance being positive.

9. The method of claim 4, wherein the method comprises:
determining, by each of the central computing systems, the corresponding verification response message by verifying each of the product identifiers against a product repository of the seller indicating products being for sale by the seller and each of the corresponding products being sold by the seller.

10. The method of claim 9, wherein the method comprises:
receiving, by each of the central computing systems, sale reports from one or more cash computing devices of the corresponding seller, each of the sale reports indicating the product identifiers of one or more of the products of the seller being sold; and
updating, by each of the central computing systems, the product repository of the seller according to each of the sale reports received from the corresponding cash computing devices.

11. A computer program product, the computer program product comprising a computer readable storage medium having program instructions embodied therewith, the program instructions being executable by a control computing device to cause the control computing device to perform a method comprising:
reading item identifiers from a set of one or more items;
broadcasting at least one verification request message comprising the item identifiers to two or more central computing systems, each central computing system belonging to a different seller;
receiving one or more verification response messages from at least one central computing system, the verification response message indicating a result of a verification for each of the item identifiers; and
controlling an alarm state according to the verification response messages.

12. The computer program product of claim 11, wherein the item identifiers are anonymized.

13. The computer program product of claim 12, wherein the item identifiers are random numbers.

14. The computer program product of claim 11, wherein:
the items are products for sale by sellers in a shared location, the shared location having at least one gate for exiting the shared location;
the item identifiers are product identifiers; and
the instructions further cause the control computing device to control an exit through the gate of one or more persons reaching the gate with the products based on the verification response messages.

15. The computer program product of claim 14, wherein the instructions further cause the control computing device to read the product identifiers from RFID tags associated with the products.

16. The computer program product of claim 14, wherein the instructions further cause the control computing device to:
determine, based on at least one of the one or more verification response messages, that one of the products has not been sold;

determine a clearance for the person being negative based on at least one of the verification results indicating that one of the products has not been sold; and prevent an exit of the person according to the clearance.

17. A system comprising:

at least one control computing device arranged at an exit gate of a shared location, the at least one control computing device including:
- a reader for reading corresponding item identifiers from a set of one or more items pertaining to one or more operators reaching the gate;
- a transmitter for broadcasting at least one verification request message comprising the item identifiers to a plurality of corresponding central computing systems of the operators;
- a receiver for receiving one or more verification response messages from at least one of the plurality of central computing systems in response to the verification request message the verification response message indicating a result of a verification of each of the item identifiers pertaining to the operator of the corresponding central computing system; and
- a processor for controlling a passage of the items through the gate according to the verification response messages.

18. The system according to claim 17, wherein the operators are sellers, the items are products for sale by the sellers in the shared location and the item identifiers are product identifiers, the system comprising an enforcement device for controlling an exit of a person with the products through the gate according to the verification response messages.

19. The system according to claim 18, wherein the system comprises said central computing systems, each of the central computing system comprising:
- a receiver for receiving the verification request message;
- a processor for determining the verification result of each of the product identifiers by verifying the product identifier against a product repository of the seller indicating products being for sale by the seller and one or more of the products of the seller being sold the seller; and
- a transmitter for transmitting the verification response message to the control computing device.

20. The system according to claim 19, wherein the system comprises one or more cash computing devices of each of the sellers, each of the cash computing devices comprising a transmitter for transmitting sale reports to the control computing device of the seller, each of the sale reports indicating the product identifiers of one or more of the products of the seller being sold, and wherein the processor of the control computing device of each of the sellers is configured for updating the product repository of the seller according to each of the sale reports received from the corresponding cash computing devices.

* * * * *